Patented July 3, 1923.

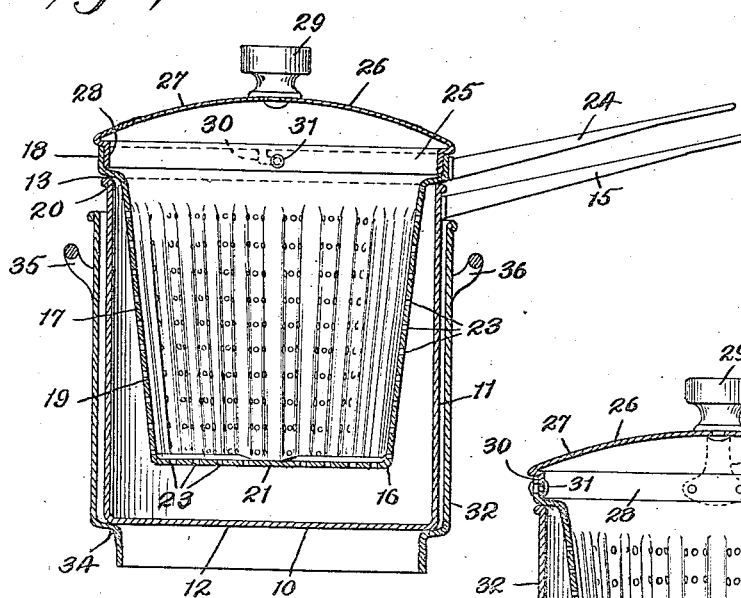
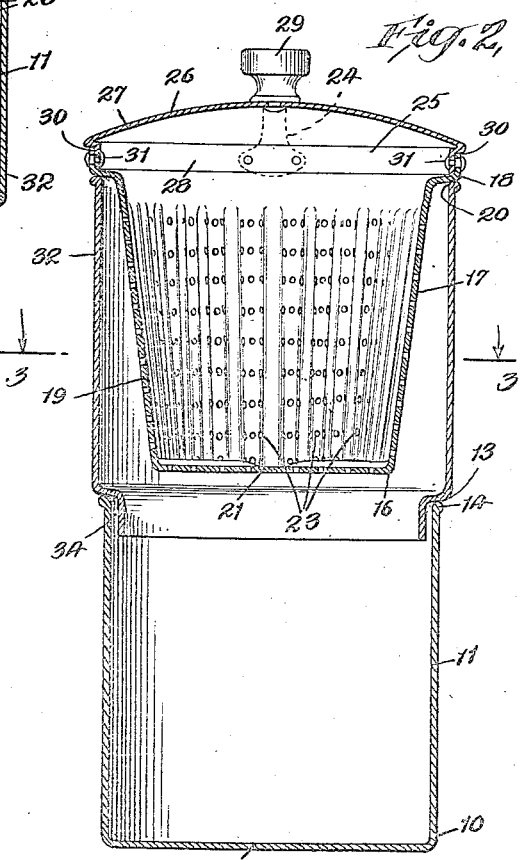
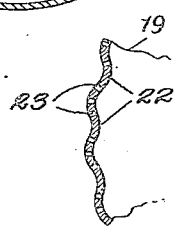

1,460,975

UNITED STATES PATENT OFFICE.

WILLIAM P. MILLER, OF BROOKLYN, AND NICHOLAS J. KARAYANIS, OF NEW YORK, N. Y.

COOKING UTENSIL.

Application filed September 16, 1922. Serial No. 588,611.

*To all whom it may concern:*

Be it known that we, WILLIAM P. MILLER and NICHOLAS J. KARAYANIS, both citizens of the United States, and residents of New York, borough of Brooklyn, in the county of Kings and State of New York, and of New York, in the county of New York and State of New York, respectively, have invented certain new and useful Improvements in a Cooking Utensil, of which the following is a full, clear, and exact specification.

This invention relates more particularly to a class of culinary articles.

Our invention has for its object primarily to provide a utensil of a form designed to be employed as a double boiler or as a steamer or as an ordinary pot for cooking food products in a manner whereby such products as potatoes, turnips and other vegetables will not tend to burn or adhere to the utensil when cooked by being boiled or steamed, especially in event of the liquid accidentally reaching a dangerously low level, and which is of a form so that when the cooking process is completed the surplus liquid may be strained from the edibles for being dispensed with or for subsequent use in making soup or as stock material without requiring the utensil to be handled in a tilting fashion when the liquid is poured from the products, thus overcoming the prevalent danger of scalding of the person attending the cooking. The invention consists essentially of an imperforate outer member and a separate inner pot member having at its upper end an annular shoulder of larger diameter than the diameter of the outer pot member for permitting the inner pot member to be removably supported on the edge of the outer pot member. The portion of the inner pot member below the annular shoulder is reduced in diameter as well as being tapered, and the reduced portion with its bottom wall is corrugated with spaced perforations in the side wall parts of each corrugation. A lid is provided for closing and opening the entrance to the inner pot member, and means is provided whereby it may be releasably locked to the inner pot member so that steam will be retained in the inner pot member when food products are cooked by steaming or boiling.

A further object of the invention is to provide a cooking utensil of a simple, efficient and durable construction which may be made in any appropriate size and shape.

With these and other objects in view, the invention will be hereinafter more fully described with reference to the accompanying drawing forming a part of this specification in which similar characters of reference indicate corresponding parts in all the views, and will then be pointed out in the claims at the end of the description.

In the drawing, Figure 1 is a longitudinal vertical section, partly in detail, taken through one form of cooking utensil embodying our invention, showing its parts assembled for boiling food products.

Figure 2, is a longitudinal vertical section taken through the utensil showing its parts assembled for steaming food products.

Figure 3, is a sectional view taken on the line 3—3 of Fig. 2, and

Figure 4, is an enlarged fragmentary view showing a section of part of the apertured corrugated wall of the inner pot member of the utensil.

The utensil has an outer pot member 10 which may be of any suitable size and shape, though the member illustrated is of a well-known form having an annular substantially perpendicular side wall 11, and a bottom wall 12, both of which are imperforate. On the edge of the entrance, as 13, of this pot member may be the usual bead or rib, as 14, and protruding laterally from the upper part of the exterior of the wall 12 may also be a suitable handle, as 15.

An inner pot member 16 is provided to adapt the utensil for use as a double boiler, and the upper portion of the side wall 17 is preferably of an annular substantially perpendicular shape, as at 18. The lower portion, as 19, of the inner pot member is of less diameter than the diameter of the wall portion 17, and this lower portion also tapers inwardly. The tapered portion is of a size to allow the inner pot member to be removably nested in the outer pot member 10, and the part of the side wall 17 at the juncture of the perpendicular wall 18 with the tapered portion 19 provides an annular shoulder 20 of a size adapted to rest upon the edge of the entrance 13 of the outer pot member when the member 16 is disposed within the member 10. The wall 17 of the inner pot member is of a length so that its bottom wall 21 will be spaced from the bottom of the outer pot member when the members are nested, and the portion 19 under the shoulder 20 of the inner pot member as well as the bottom wall 21 are corrugated or fluted, as at 22, so that food products, such as potatoes, turnips and other tuberous vegetables and fruit, when cooked in the inner pot member will tend to lie against the apexed edges of the corrugations for preventing the products from adhering to the wall of the pot member during cooking process. In both of the side walls of each of the corrugations and throughout their lengths are spaced perforations, as 23, for admitting steam or liquid into the inner pot member and for permitting the cooked products to be drained of liquid by lifting the inner pot member from the outer pot member. The requirement for tilting the inner pot member to drain the food products therein will thereby be avoided. Extending laterally from the exterior of the perpendicular portion 18 of the side wall of the inner pot member may be a suitable handle, as 24, and the entrance 25 of the inner pot member is closed and opened by a lid or cover, as 26.

The lid 26 has a top plate with an annular flange, as 28, depending from its underside, and the lid is of a size so that the flange removably fits snugly in the entrance of the inner pot member 16, while the top plate rests upon the edge of the entrance of this member. The lid may be provided with a handle or knob, as 29, which protrudes upwardly from the center of the top plate of the lid, and serving as means to releasably lock the lid to the inner pot member 16 for retaining the steam in this member when food products are boiled or steamed therein, in the edge portion of the perpendicular part 18 of the wall of the inner pot member may be one or a number of spaced notches, as 30, each of which may be somewhat of an L-shape. Protruding from the exterior of the flange 28 of the lid are a similar number of spaced lugs or knobs 31 which are of sizes so that they removably fit in the notches 30. The notches 30 and the knobs 31 are of sizes as well as being relatively arranged so that the lid when separated from the inner pot member 16 is applied to the member and is disposed accordingly the knobs 31 of the lid will pass into the entrances of the notches 30 with the insertion of the flange 28 in the inner pot member, and by partially rotating the lid the knobs will move into the angular portions of the notches which in turn will cause the lid to be releasably fastened to the pot member.

A band member, as 32, may be provided for use in conjunction with the outer pot member 10 and with the inner pot member 16 when the utensil is employed especially for steaming food products. The wall 33 of this band member is of larger diameter than the wall 12 of the outer pot member as well as being of a diameter so that the part of the tapered wall 17 at its juncture with the perpendicular part of the wall of the inner pot member will rest on the upper edge of the band member when the inner pot member is nested in the band member. The lower edge portion of the band member is reduced in diameter, as at 34, for insertion in the outer member to allow the band member to be removably supported on the upper edge of the entrance of the outer pot member, and on the exterior of the wall of the band member may be two handles, as 35 and 36.

When the device or utensil is used as a boiler for cooking food products the inner pot member 16 is removably nested in the outer pot member 10, as shown in Fig. 1, and the outer pot member is nested in the band member 32. Sufficient quantity of water is then boiled in the outer pot member with the food products being placed within the inner pot member so that the products are immersed in the water, and by lifting the inner pot member from the outer pot member when the products are sufficiently boiled the liquid will be drained therefrom through the perforations 23 of the inner pot member without requiring the liquid to be poured from the inner pot member. When it is desired to use the utensil as a steamer the band member 32 is removably mounted on the edge of the entrance of the outer pot member, as shown in Fig. 2, and the inner pot member is then nested in the band member. By boiling water in the outer pot member the steam generated will pass into the band member and through the perforations of the inner pot member, into the inner member for suitably steaming the food products in the inner pot member.

In the foregoing description, we have embodied the preferred form of our invention, but we do not wish to be understood as limiting ourselves thereto, as we are aware that modifications may be made therein without departing from the principle or sacrificing any of the advantages of this invention, therefore, we reserve to ourselves the right to make such changes as fairly fall within the scope thereof.

Having thus described our invention we claim as new and desire to secure by Letters Patent:—

1. A cooking utensil, comprising an outer imperforate pot member, a separate supporting band member having its upper portion larger than the wall of the outer pot member for allowing the pot member to be removably nested in the band member, and having its lower end portion reduced for insertion in the outer pot member as well as providing an annular shoulder whereby the band member may be removably supported on the edge of the wall of the outer pot member, and an inner pot member having at its upper end an annular shoulder larger than the band member and larger than the outer pot member, the portion of the inner pot member below its shoulder being reduced as well as being tapered and the tapered portion with the bottom of the inner pot member also being fluted with spaced perforations in the outer side wall parts of each flute.

2. A cooking utensil, comprising an outer imperforate pot member, a separate supporting band member having its upper portion larger than the wall of the outer pot member for allowing the pot member to be removably nested in the band member, and having its lower end portion reduced for insertion in the outer pot member as well as providing an annular shoulder whereby the band member may be removably supported on the edge of the wall of the outer pot member, an inner pot member having at its upper end an annular shoulder larger than the band member and larger than the outer pot member, the portion of the inner pot member below its shoulder being reduced as well as being tapered and the tapered portion with the bottom of the inner pot member also being fluted with spaced perforations in the outer side parts of each flute, a lid for closing and opening the entrance to the inner pot member, and means whereby the lid may be releasably locked to the inner pot member.

3. A cooking utensil, comprising an outer imperforate pot member having a perpendicular wall, a separate supporting band member having its upper portion larger than the wall of the outer pot member for allowing the pot member to be removably nested in the band member, and having its lower end portion reduced for insertion in the outer member as well as providing an annular shoulder whereby the band member may be supported on the edge of the wall of the outer pot member, an inner pot member having a perpendicular wall portion at its upper end larger than the band member and larger than the outer pot member, the portion of the inner pot member below its perpendicular wall being reduced as well as being tapered and the tapered portion with the bottom of the inner pot member also being fluted with spaced perforations in the outer side wall of each flute, and a lid for closing and opening the entrance to the inner pot member, and means whereby the lid may be releasably locked to the inner pot member.

This specification signed and witnessed this 15 day of September, A. D. 1922.

WILLIAM P. MILLER.
NICHOLAS J. KARAYANIS.

Witnesses:
S. ZUCKER,
J. FREDERICK CRYER.